(No Model.)
E. FOX.
MANUFACTURE OF GLUCOSE OR GRAPE SUGAR.
No. 257,930. Patented May 16, 1882.
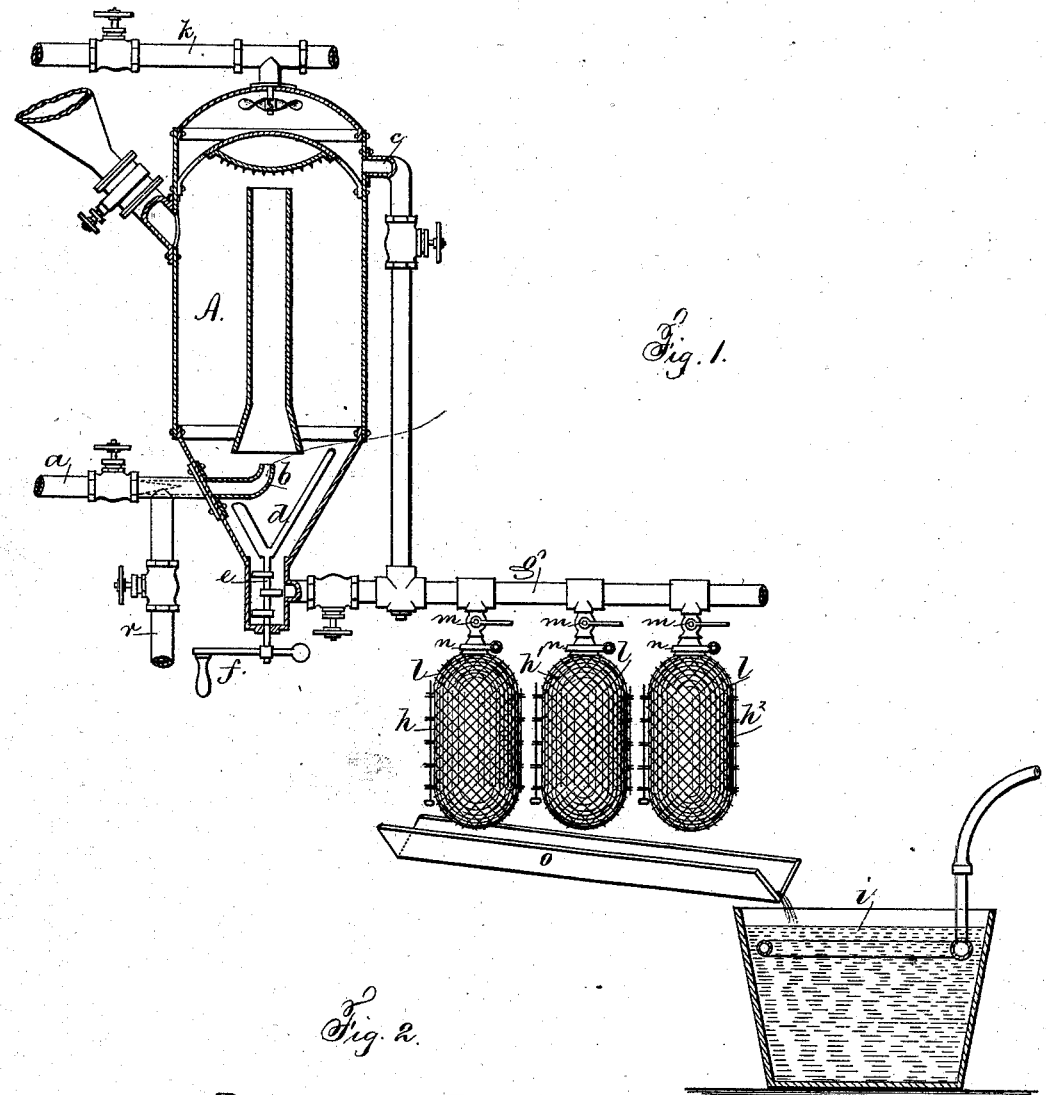

UNITED STATES PATENT OFFICE.

EDWARD FOX, OF NEW YORK, N. Y., ASSIGNOR TO ANDREW ALBRIGHT, OF NEWARK, NEW JERSEY.

MANUFACTURE OF GLUCOSE OR GRAPE-SUGAR.

SPECIFICATION forming part of Letters Patent No. 257,930, dated May 16, 1882.

Application filed March 27, 1882. (No model.)

*To all whom it may concern:*

Be it known that I, EDWARD FOX, of the city and State of New York, have invented an Improvement in the Manufacture of Glucose or Grape-Sugar, of which the following is a specification.

I make use of portions of the apparatus patented to me, (No. 216,841 and No. 243,769,) and have added thereto the devices which are required for putting into operation the present improved method of making glucose and grape-sugar.

In the drawings, Figure 1 is a vertical section of the apparatus employed by me. Fig. 2 shows the separate wire casings as open and shut.

Into the vessel A the corn or similar material is fed, either whole or in a broken condition, and water is allowed to pass in upon the grain in the form of spray. The mass is violently agitated by the action of air admitted by the pipe and cock $a$ and nozzle $b$. The starch is dissolved, and it passes off with the water by the overflow $c$ into a suitable vessel for the starch to subside, or it is separated by filtration for the subsequent operations. By this part of my process the starch is more thoroughly separated than heretofore, and the bran and gluten are retained, and can be discharged under pressure into the filtering-bags, so as to squeeze any remaining starch-liquor out of the refuse material.

In the bottom of the vessel A, I place a series of stirrers, $d$, that extend out radially at an inclination to a central shaft, $e$, which passes through the bottom of the elbow of the discharge-pipe, and it is provided with a handle, $f$, on the outside, so that the material that is below the air or steam inlet $b$ can be stirred to prevent its becoming clogged when it is required to empty the vessel.

The overflow-pipe $c$ is connected at its lower end with the filter-pipe $g$, from which filtering-bags $h'$ $h^2$ are suspended, and there is a trough, $o$, below these bags to catch the water and starch that runs through them and convey it to the tank $i$. The bran and gluten will be retained in the filters; and I remark that with this object in view the sieves or filter-bags are to be made of any suitable material with meshes adapted to this object and inclosed in sheaths or casings, so as to be capable resisting pressure, and arranged to allow the filtering process to be continuous.

I employ for the conversion of the starch into sugar either acids or the diastase of malt. These materials and their mode of operation, being well known, do not require further description. The feature of my improvement in this particular relates to the introduction of the starch into the vessel A, or a similar one, the same being lined with or made of materials that will not be injured either by the acids or alkali made use of, and while said starch is in said vessel I introduce acid for its conversion into sugar in the form of spray by the pipe $k$, and I agitate the material by introducing steam or heated air to bring the mass to the proper temperature, and then I introduce atmospheric air, the effect of which is to increase the rapidity of action of the acid on the starch, and at the same time to agitate the starch and insure uniformity in the operation, and I find that the oxygen of the air assists the acid in converting the starch into sugar. When by tests taken through the try-cock it appears that the conversion of the starch into glucose has reached the proper point any remaining traces of acid are neutralized by an alkali—such as lime—injected with the air or in solution into the digesting-vessel A. Such alkali may be in the form of a powder, a liquid, or a gas. At the same time the atmosphere, as introduced, cools off the materials in the digester. The surplus acids containing oils, &c., are to be drawn off preferably by the overflow-pipe and cock before applying the alkali. The low temperature at which this conversion and neutralization take place in consequence of the presence and agitation of the air prevents the material being burned or discolored. I remark that with my improved methods I am enabled to make the pressure and temperature in the digesting-vessel independent of each other. This cannot be accomplished in any other digesting or converting vessel using pressure.

Filters have been made of bags, into which the materials to be filtered have been placed, and these sometimes are connected to a supply-pipe. Generally these bags are subjected to pressure between a bed and follower in a press. This consumes more time than is advantageous, because in the manufacture of glucose or grape-sugar the material is subject to injurious fermentation and change under atmospheric action. I therefore employ a range of filter-bags, of cloth or similar material, within perforated casings $l$, and I connect each bag and casing removably to a supply-pipe, $g$.

I have represented the main supply-pipe $g$ as provided with downward branches and cocks $m$. The filter-bags are of cloth, with meshes adapted to the material operated upon, and the casings $l$ are of wire-work, or cords or rods surrounding the filter-bags, so as to sustain them under the pressure to which they are subjected, and the bags and casings are clamped to the branch pipes by the movable clamping-rings $n$, as shown.

Beneath the range of filters is a trough, $o$, by means of which the filtrate is conveyed to the vat $i$.

I am able to obtain a continuous filtering operation by my apparatus, because I employ in the vessel A whatever pressure is required for forcing the material out of the said vessel and through the filter-bags, and as soon as one bag becomes filled with gelatinous material and the starch ceases to pass through such filter the flow of liquid to that bag is shut off, the bag removed and another substituted, and the operation is proceeded with continuously, some bags being in use as filters, while others are being removed, emptied, and replaced.

In the tank or vat $i$ there is a perforated pipe below but near the surface, and into this atmospheric air in a refrigerated condition is forced, and by escaping downwardly it cools the sirups or other material passing into the vessel. The air may circulate through a coil of pipes and cool the sirup without escaping into such sirup, and scrapers should be provided to remove the sugar that may crystallize on the surfaces of such pipes.

After the starch has been transformed into glucose or grape-sugar the sirup is concentrated and crystallized or granulated in the same apparatus or another of the same character. The evaporation is done in the vessel A by the introduction of steam or air, or both, by the pipes $a$ and $r$, and when sufficiently concentrated cold air may be used to cool the sirups and aid in the crystallization. The filter-bags $h$ $h'$ $h^2$ in this instance become the receptacles of the sugar, and by forcing the sirup through the material in the filter the sugar becomes hardened and fit for use. The sirup passes away by the trough, and is again treated until the crystallizable portion is extracted.

It is to be understood that the air employed to cool the sirup may be cooled in a vessel similar to that shown in my Patent No. 243,769, and in the manner therein described.

Any suitable apparatus can be employed in cooling or heating the air made use of in the aforesaid operations, the same not forming part of this invention.

By agitating the material by the air or steam blown into the same the flavor is improved, because the essential oils are either evaporated or brought to the surface, and when cold air is used upon the sirups the crystallization is rendered more rapid and perfect.

It is to be understood that the apparatus represented in the drawings can be used first for the separation of the starch, then for the conversion of the same into glucose or grape-sugar, then for cooling such material and crystallizing the same and separating the sirups; but usually there will be three sets of apparatus—one for each of the operations—in order that one apparatus may only be used for the one operation, thereby avoiding the cleaning out of the apparatus between one operation and the next.

I am aware that starch has been separated from grain by the action of water and agitation and pressure; also, that the conversion of starch into glucose has been effected by the action of acids; also, that the material has been subjected to neutralizing and evaporating operations, and has been filtered and concentrated in the manufacture of sugar from wheat, corn, &c. By my process I make use of air for agitating the mass of grain and water and separating the starch. This enables me to produce a violent agitation, and to employ any desired pressure without any material change in the temperature of the mass. In the conversion of the starch into glucose I am able to regulate the temperature by the conjoint action of the air and steam, and to obtain any required pressure and agitation without requiring steam at such a high pressure and temperature as to be injurious. In the evaporating operation the atmosphere carries off the vapors rapidly and agitates the mass, so as to produce a rapid concentration at a low temperature. In the filtration I am enabled to obtain by the use of the atmospheric air under pressure acting upon the material in the concentrator any desired pressure, and pass the material directly through the filter without the use of any intermediate vessel. In all of these operations the atmosphere under pressure enables me to control the action of the apparatus upon the material under treatment in respect to the pressure and agitation, and the steam allows for the temperature being regulated to any desired point.

I claim as my invention—

1. The method herein specified of extracting starch from grains—such as corn—consisting in agitating such material and water by the action of atmospheric air in a digesting vessel, then passing the digested material through filters to retain the gluten, substantially as set forth.

2. The method herein specified of treating starch or grain for its conversion into glucose or grape-sugar, consisting in agitating the same by currents of air under pressure and heating the same to the proper temperature by steam in a converting-vessel in the presence of acid, neutralizing any surplus acid and removing the same and any impurities, then concentrating the sirup by the action of currents of air or steam, or both, forced through the liquid, and then crystallizing or granulating the material in filter-bags, through which the sirup is forced from the converter by the pressure of air in such converter, substantially as set forth.

3. The combination, with the converting-vessel and the delivery-tube, branch pipes, cocks, and filter-bags, of an air-pipe connected to the converting-vessel and serving to admit air under pressure for forcing the contents of the converter directly to the filters, substantially as specified.

Signed by me this 24th day of March, A. D. 1882.

EDWARD FOX.

Witnesses:
GEO. T. PINCKNEY,
HAROLD SERRELL.